Patented June 21, 1938

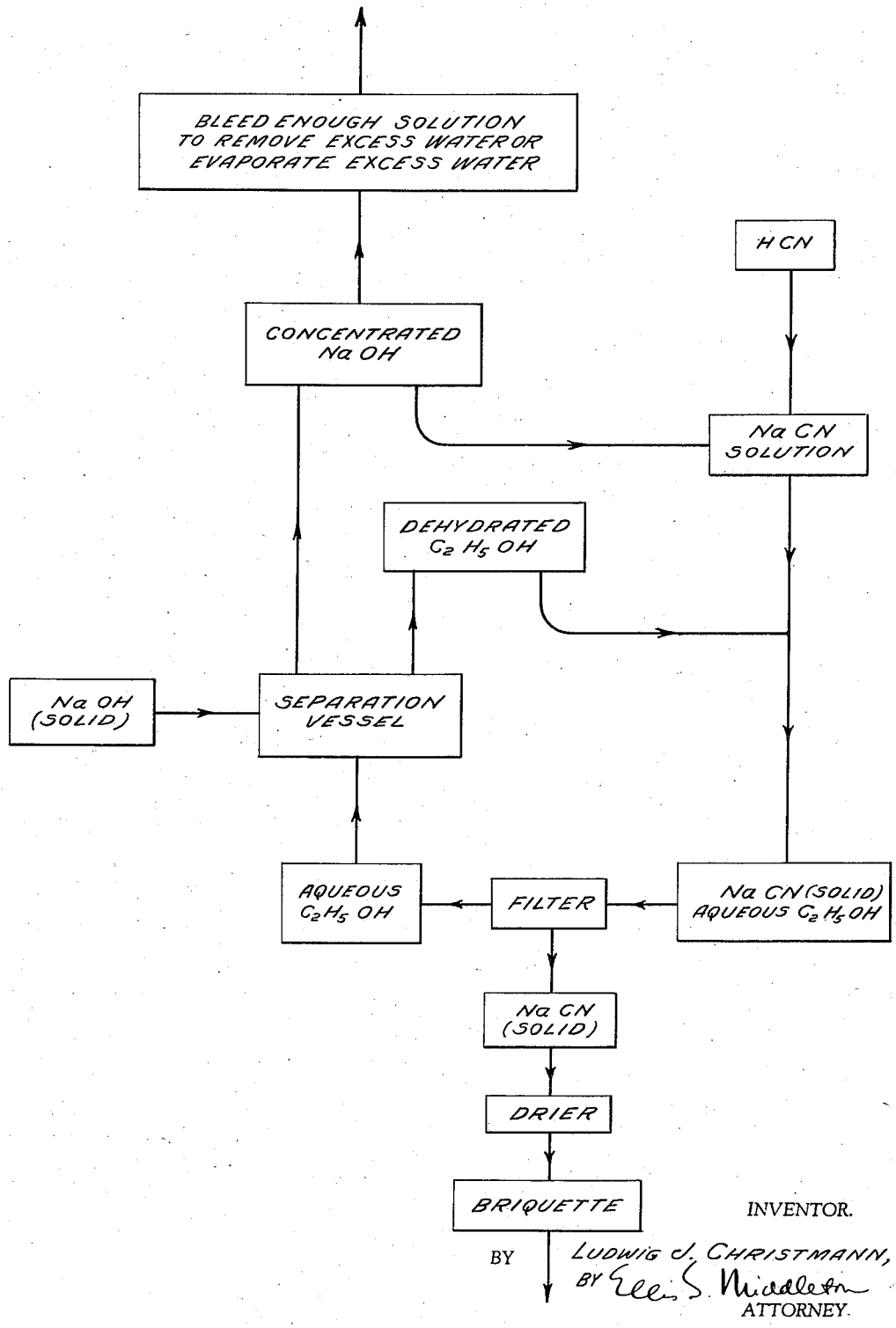

2,121,020

UNITED STATES PATENT OFFICE 2,121,020

MANUFACTURE OF HIGH GRADE SODIUM CYANIDE

Ludwig J. Christmann, Jersey City, N. J., assignor to American Cyanamid Company, New York, N. Y., a corporation of Maine Application March 10, 1936, Serial No. 68,005

13 Claims. (Cl. 23—79)

The present invention relates to a cyclic method of preparing an alkali cyanide in solid form without the necessity of passing it through an evaporating stage.

The principal object of the invention is the preparation of an alkali cyanide, preferably an alkali metal cyanide by cyclic methods whereby a reagent used in the preparation of the material may be reconditioned automatically, making unnecessary further additions thereof to the cycle except within very narrow limits.

To this end, the invention contemplates the neutralization of a concentrated solution of alkali hydroxide with hydrocyanic acid to form the desired cyanide in solution. To this mixture, a water miscible liquid is then added in which the cyanide is insoluble or substantially so, resulting in the precipitation of the cyanide in solid form. The cyanide may then be separated from the liquid and to the latter solid alkali hydroxide added. This addition causes a reconditioning of the precipitating liquid and simultaneous production of concentrated alkali hydroxide solution. The cycle is then repeated. The detailed process is shown in the flow sheet.

Referring to this diagrammatic showing, it will be seen that it is first proposed to prepare a concentrated solution of caustic soda in water. This should preferably be a 1:1 solution. Hydrocyanic acid is then added either in liquid or gaseous form until neutralization has been effected. The sodium cyanide in solution is then precipitated by adding requisite quantities of a substantially anhydrous water miscible liquid, of which ethyl, isopropyl and tertiary butyl alcohols are examples. While any substantially anhydrous water miscible liquid in which the cyanide is substantially insoluble may be used, yet the above are preferred because of their greater efficiency. The solid cyanide is separated from the aqueous alcohol as by filtering or the like, suitably dried to remove residual alcohol and briquetted or not as desired. The aqueous alcohol is then mixed with an additional quantity of solid caustic soda, with the consequent production of concentrated caustic soda solution and substantially anhydrous alcohol, the caustic soda serving to recondition the alcohol for re-entry into the cycle. Where desired, the chemical water which would otherwise build up in the system may be removed either by bleeding enough of the solution to remove this excess water or the water may be evaporated at a suitable point in the cycle.

The following is given as a specific example: 500 cc. of 1:1 caustic soda solution containing 376 gms. of caustic soda was neutralized with 249 gms. of hydrocyanic acid. To this solution, heated to 40° C. 1473 cc. of anhydrous ethyl alcohol at the same temperature was added. The precipitated crystals of sodium cyanide were then filtered from the menstruum, and dried in a vacuum oven at 72° C. and recovered. The filtrate was found to be principally aqueous ethyl alcohol with a small percent of residual sodium cyanide. 500 cc. of this aqueous alcohol mixture was then mixed with 150 grams of solid caustic soda with agitation whereupon the alcohol was dehydrated to a substantial extent. The caustic soda solution and the aqueous alcohol stratified, permitting reasonable separation. The cycle was then repeated.

From the above, it will be noted that a cyclic system for the production of an alkali metal cyanide has been proposed which does not involve evaporation of that solid from a water solution. The difficulties attending such recovery are, therefore, avoided. The anhydrous alcohol used to precipitate solid alkali metal cyanide, is reconditioned by means of additional quantities of solid caustic going back into the system, all of which makes for a smooth working, efficient system. Alkali metal cyanide crystals of the order of 97% purity have been recovered by this method.

I claim:

1. A cyclic method of preparing an alkali metal cyanide in solid form which comprises neutralizing HCN with a concentrated solution of an alkali metal hydroxide, thus forming an alkali metal cyanide in solution, adding to the reaction material a water miscible liquid containing only a small quantity of water, in which the alkali metal cyanide is substantially insoluble, in an amount sufficient to precipitate substantially all of the alkali metal cyanide, separating the aqueous liquid and the cyanide and recovering the latter, treating the aqueous liquid with sufficient solid alkali metal hydroxide to cause some dehydration of the water miscible liquid and separation of the total liquid into two phases, one a solution of alkali metal hydroxide, and the other predominantly the water miscible liquid and using the hydroxide solution to neutralize additional quantities of HCN, and the partially dehydrated water miscible liquid to precipitate out the thus formed alkali metal cyanide.

2. The method of claim 1 in which the hydroxide is of sodium.

3. The method of claim 1 in which the HCN is in liquid form.

4. The method of claim 1 in which the hydroxide initially used is substantially a 1:1 solution.

5. The method of claim 1 in which the separation of the hydroxide solution from the water miscible liquid is accomplished by stratification.

6. The method of claim 1 in which the cyanide is precipitated from solution at substantially 40° C.

7. The method of claim 1 with the additional step of removing the excess water from the system.

8. The method of claim 1 using sodium hydroxide as a 1:1 solution with the additional step of removing the excess water from the system.

9. The method of claim 1 in which the water miscible liquid is an alcohol.

10. The method of claim 1 in which the water miscible liquid is chosen from the group comprising ethyl, isopropyl and tertiary butyl alcohols.

11. The method of claim 1 in which the water miscible liquid is ethyl alcohol.

12. The method of claim 1 in which the water miscible liquid is isopropyl alcohol.

13. The method of claim 1 in which the water miscible liquid is tertiary butyl alcohol.

LUDWIG J. CHRISTMANN.